(12) United States Patent
Fedegari

(10) Patent No.: US 6,481,247 B1
(45) Date of Patent: Nov. 19, 2002

(54) CLEANING METHOD AND APPARATUS WITH DENSE PHASE FLUID

(75) Inventor: Fortunato Fedegari, Pavia (IT)

(73) Assignee: Fedegari Autoclavi SpA, Albuzzano (IT)

( * ) Notice: Subject to any disclaimer, the term of this patent is extended or adjusted under 35 U.S.C. 154(b) by 0 days.

(21) Appl. No.: 09/743,011

(22) PCT Filed: Jun. 10, 1999

(86) PCT No.: PCT/EP99/04042

§ 371 (c)(1),
(2), (4) Date: Dec. 29, 2000

(87) PCT Pub. No.: WO00/01871

PCT Pub. Date: Jan. 13, 2000

(30) Foreign Application Priority Data

Jul. 2, 1998 (IT) .......................................... MI98A1518

(51) Int. Cl.[7] ............................ D06F 43/02; D06F 43/08
(52) U.S. Cl. ......................... 68/18 C; 68/18 F; 68/139; 68/140; 68/196; 68/210
(58) Field of Search ................. 68/18 R, 18 C, 68/18 F, 139, 140, 196, 210

(56) References Cited

U.S. PATENT DOCUMENTS

| | | | | |
|---|---|---|---|---|
| 3,498,089 A | * | 3/1970 | Miller et al. | 68/139 |
| 5,943,721 A | * | 8/1999 | Lerette et al. | 68/139 |
| 6,070,440 A | * | 6/2000 | Malchow et al. | 68/139 |
| 6,233,980 B1 | * | 5/2001 | Kegler et al. | 68/139 |
| 6,237,374 B1 | * | 5/2001 | Malchow et al. | 68/139 |

FOREIGN PATENT DOCUMENTS

| EP | 0 564 396 A1 | 6/1993 |
|---|---|---|
| EP | 0 679 753 A2 | 2/1995 |
| EP | 0 828 020 A2 | 11/1998 |
| WO | 97/33031 | 12/1997 |

* cited by examiner

*Primary Examiner*—Philip Coe
(74) *Attorney, Agent, or Firm*—Darby & Darby

(57) ABSTRACT

The invention relates to a cleaning apparatus which uses as operative fluid liquid and/or supercritical carbon dioxide ($CO_2$) or other dense-phase fluids such as ammonia or hydrocarbons. The apparatus may have various applications including the cleaning of garments and the degreasing of electronic or mechanical components; the apparatus comprises a cleaning chamber (1), basically formed by a pressurised container, and an installation for supplying the $CO_2$ which includes a storage tank (30) and a distiller (31). Advantageously, in order to start a cleaning cycle, the chamber (1) is pressurised with gaseous $CO_2$ taken from the tank and/or from the distiller which are then excluded from the path of the liquid $CO_2$ used for the actual cleaning. The invention also comprises a special cleaning chamber (1) having a lid and a cylindrical jacket, that are provided with respective mating edges between which operates an improved seal suitable for preventing leakage of supercritical fluids.

10 Claims, 9 Drawing Sheets

CLEANING METHOD AND APPARATUS WITH DENSE PHASE FLUID

The present invention relates to cleaning apparatuses in which a dense phase fluid, such as, for example, liquid and/or supercritical carbon dioxide ($CO_2$), is used as operative fluid.

Before proceeding further, it should be pointed out that in the text of this description and in the following claims, the generic expression "dense phase" is intended to define the various phases in which a high pressure fluid may be and which include the liquid phase as well as the subcritical and supercritical phases.

It is also important to state beforehand that, although reference will be made in this description mainly to carbon dioxide as the operative cleaning fluid, the matters that will be set forth are to be understood as being valid also for other fluids, such as, for example, ammonia and some hydrocarbons which may be used in cleaning apparatuses manufactured in accordance with the principles that will become clear hereinafter.

The mentioned apparatuses were developed fairly recently within the framework of special aims, such as the dry-cleaning of garments and textile fibres in general, and the degreasing and cleaning of electronic components or mechanical parts in general. There is already a large number of scientific publications and patents dealing with this subject and, for all of them, reference will be made here only to U.S. Pat. No. 5,467,492, whose proprietor is Hughes Aircraft Company.

More generally, it may be stated that nowadays the use of dense-phase cleaning fluids and in particular carbon dioxide, is gaining increasing importance for various reasons which include among others the considerable qualities of this gas as a solvent when it is in the liquid or supercritical state, its non-toxicity and the absence of effects on the environment when it has to be disposed of, since it is possible to expel it freely into the atmosphere without causing pollution.

Mention should also be made of the fact that $CO_2$ is available naturally at no cost and that, owing to its physical properties, it can be used in cleaning cycles at ambient temperature (typically from 0 to 40° C.).

Owing to these characteristics, carbon dioxide is able to replace all those solvents currently used in the dry-cleaning of clothing or in the other applications mentioned above that are based on perchloroethylene (PCE), derivatives of petroleum or chlorofluorocarbons (CFCs).

The apparatuses mentioned above, although intended for a variety of purposes, comprise a cleaning chamber which accommodates the objects to be cleaned, irrespective of whether these are items of clothing, electronic components, mechanical parts or other.

These chambers are connected to an installation which supplies liquid or supercritical $CO_2$ and which contains the means necessary for the production and circulation thereof, together with various filters for separating it from the (solid, liquid or gaseous) substances which it removes from the objects to be cleaned; the chambers in question may contain drums or baskets, especially in the case of washing machines for garments, or supports of various types on which the objects are placed.

In order to obtain apparatuses wherein carbon dioxide in the liquid or supercritical state can circulate with the temperatures mentioned above, it is necessary to have operating pressures of the order of tens of bars (usually from 30 to 80 bar).

It will be appreciated that this requires accurate design and manufacture of the apparatuses, and all the more so if it is borne in mind that they may be used under safety conditions that are not particularly accurate or by persons without special training, such as, for example, in the case of clothes washing machines advantageously applied in ordinary commercial laundries.

Since the specific interest in carbon dioxide cleaning apparatuses has developed only recently, they have not yet been manufactured on an industrial scale; in other words, the cleaning apparatuses currently known are basically prototypes and are therefore not specifically suited to a practical use such as these put forward above.

Moreover, these prototypes do not generally have large dimensions and, in addition, even the patents mentioned in the introduction provide only general information on process aspects and do not go into any greater detail about the structure of the apparatuses.

Considering now U.S. Pat. No. 5,467,492, which has already been referred to, this patent provides only a schematic illustration of an apparatus where a cleaning chamber is connected to an installation which comprises a $CO_2$ tank, a separator (or distiller), a condenser and a circulation pump.

The patent concentrates principally on aspects relating to the agitation of the items of clothing present in the cleaning chamber in order to obtain better cleaning thereof, but does not provide useful information on how the apparatus actually functions.

This is not of secondary importance because, as it has already been stated, it is necessary to operate with a high pressure fluid and this fact therefore involves substantial difficulties.

For example, it is not clear from that document how the initial transitory start-up state of the apparatus occurs, after the garments to be cleaned have been loaded into its cleaning chamber; in that situation, the chamber is at atmospheric pressure and if liquid $CO_2$ coming from the associated tank is introduced thereinto it as shown by the diagram referred to, i.e. with a pressure from 35 to 70 bar according to the information given in the patent, then the resulting expansion causes sudden cooling of the chamber and the clothes present therein, with the risk that they will be damaged. The preheater provided in the apparatus could perhaps be used to avoid that risk, but the description does not explain how the preheater is to operate and in fact it gives rise to several uncertainties regarding its actual effectiveness in preventing the above-mentioned risk. EP-A-0,828,020 discloses a washing method and a related apparatus, based on pressure swing absorption with a supercritical fluid; in this prior document there are general features of a washing apparatus working with liquid $CO_2$ but not the draining thereof.

Moreover, in this document the cleaning chamber is shown purely schematically; it must not be forgotten that the chamber represents a very important part of these apparatuses.

Indeed, it has to provide for the necessary sealing at the high operating pressures and must at the same time be easy to open and close with a high degree of operator safety; this concerns the commercial laundries already mentioned where there are a large number of successive operating cycles of the apparatus with the opening and closing of the chamber. Each time, an operator has to check that the chamber is closed correctly or that the pressure has fallen to a suitable level before being able to open it.

Although it is clear that the apparatuses are provided with a suitable monitoring system, the possibility of breakdowns or malfunctions should not be overlooked and therefore it may be said that arrangements for greater security can never be enough.

The object of the present invention is therefore to provide a cleaning method carried out with a carbon dioxide apparatus of the type considered above, whose features satisfy the requirements of the practical applications for which such cleaning is intended.

The object is achieved by a method whose technical features are set out in the claims appended to this description; the invention also includes an apparatus for carrying out the method, the features thereof are also contained in the above-mentioned claims.

The invention will be better understood in the light of the description given hereinafter which relates to a preferred, non-limiting embodiment thereof, illustrated in the appended drawings wherein.

Figure 1:
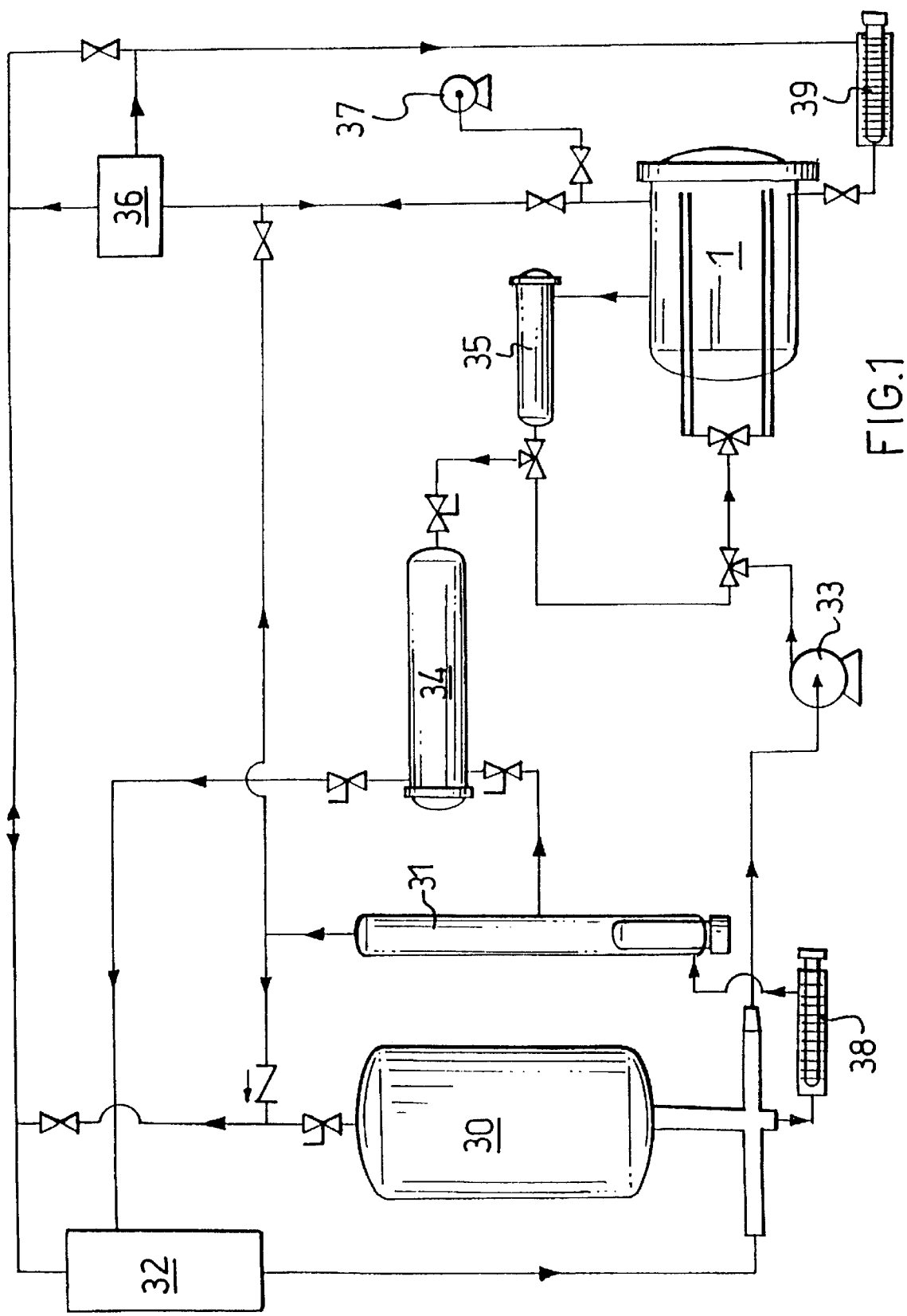
FIG. 1 is a diagram of an apparatus according to the invention.
Figure 2:
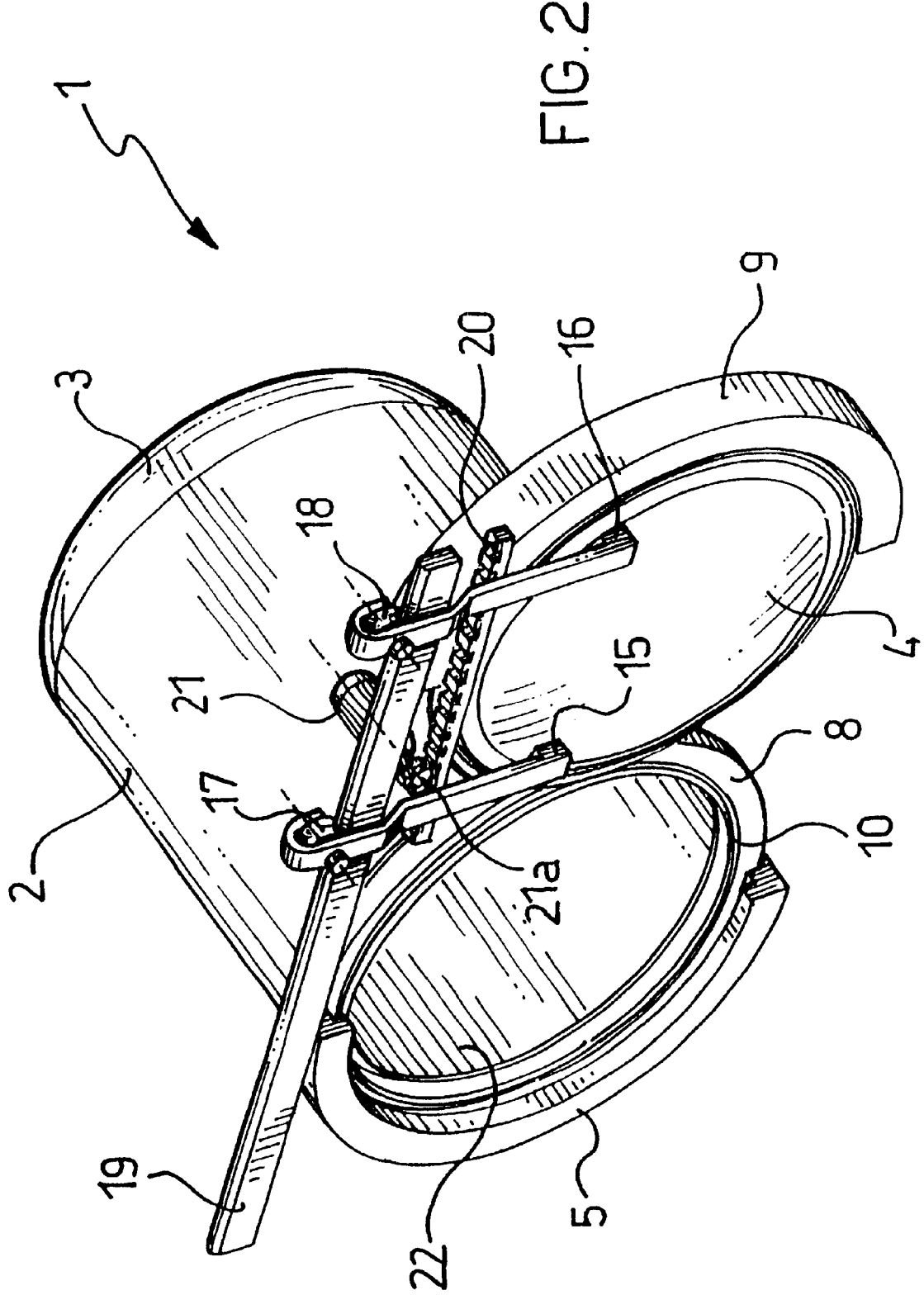
FIG. 2 is an axonometric view of a cleaning chamber incorporated in the apparatus of FIG. 1, in the open state.

Likewise it is commonly known, the apparatus of FIG. 1 comprises a cleaning chamber 1, which will be discussed more comprehensively hereinafter, a tank 30 for liquid $CO_2$, a distiller 31 for separating the substances dissolved in the $CO_2$, a refrigerating unit 32 for keeping the circulating fluid in the required conditions, and a main pump 33.

In addition, the apparatus of FIG. 1 contains a primary 34 and a secondary 35 filter, a compressor 36, a vacuum pump 37 and two heaters 38, 39.

All these components are also connected by a hydraulic circuit which comprises numerous valves indicated in the diagram of FIG. 1 (although not numbered) for the circulation of the liquid carbon dioxide in the cleaning apparatus; the circulation will be explained hereinafter in connection with the carrying out of a cycle for cleaning garments. It will be appreciated, however, that the same points will apply also to the cleaning of mechanical or electronic components and the like.

When the load to be cleaned is introduced into the chamber 1, the latter is isolated, for obvious reasons, from the portions of the circuit where pressurised $CO_2$ is present by closing the necessary valves.

Once filled, the cleaning chamber 1 is closed and the pump 37 creates a vacuum inside it; preferably, the level of vacuum reached should be at least approximately 80 mbar in order to be able to remove the air present in the chamber and in the fibres of the clothing thus facilitating the penetration of the $CO_2$ into the clothing and minimising (practically eliminating) the presence of incondensables in the cleaning fluid.

Thereafter the chamber 1, which has in the meantime been brought into communication with the remainder of the circuit from which it had previously been isolated, is pressurised.

In order to cause the pressure level to rise without the disadvantages mentioned above (sudden evaporation of the $CO_2$ and cooling of the load), $CO_2$ is initially introduced in the chamber in gaseous phase (instead of in liquid phase); advantageously, the $CO_2$ is first taken from the distiller 31 where it is available at a pressure lower than that in the tank 30.

This takes place as long as the difference in pressure P between the chamber 1 and the distiller 31 does not decrease in such a manner as to make the flow of carbon dioxide too slow, thereby prolonging the operation excessively; for example, a minimum value used in practice for P is approximately 3 bar.

After this first pressurisation step, further gaseous $CO_2$ coming from the upper portion of the tank 30 where it is in equilibrium with its liquid phase, is introduced into the chamber 1 since, in the cleaning apparatus of this example, the tank 30 is under a pressure greater than that the distiller 31, especially when $CO_2$ has already been taken from the latter in order to pressurise the chamber.

In this connection, it should also be pointed out that according to a preferred embodiment of the invention, the tank 30 is connected to the distiller 31 so that the liquid $CO_2$ present at the bottom of the former can flow into the latter, taking advantage of the difference in pressure existing between them; by doing that, it is possible in the distiller to separate the $CO_2$ from the heavier oils present at the bottom of the tank or from any particles deposited there.

In order to promote separation, it is advantageous to heat the $CO_2$ which goes out of the tank 30 by means of the heater 38, because it is thus possible to minimise the energy absorption peaks which would occur if the $CO_2$ were heated directly in the distiller 31.

When the pressurisation of the cleaning chamber 1 has been completed, preferably when the value of the pressure inside it is still sufficiently lower than that in the tank 30, the cleaning chamber 1 is filled with liquid $CO_2$ coming from said tank.

In this stage, the main pump 33 is active and, in accordance with a preferred embodiment of the invention, the filling of the chamber takes place in two stages; during the first one, the chamber 1 does not evacuate and the $CO_2$ does not flow downstream thereof; that is to say, circulation takes place from the tank 30 to the chamber 1 by means of the pump 33: in this manner the risk of applying an excessive pressure to the primary filter 34 is avoided.

In a second stage, the chamber 1 is brought into communication with the primary filter 34 and $CO_2$ circulation is established in the apparatus through, in succession, the pump 33, the chamber 1, the secondary filter 35 and the main filter 34, the refrigerating unit 32, the tank 30 and then, again, the pump 33.

When the liquid $CO_2$ has reached the predetermined level for starting the actual cleaning operation, the tank 30 is excluded from the path of the fluid which passes through the chamber 1, as was previously the distiller 31; this takes place for a predetermined lapse of time (timing means not indicated in the diagram of FIG. 1 are indeed present in the apparatus) during which the circulation of $CO_2$ occurs only along the ring formed by the pump 33, the chamber 1, the filters 35 and 34, the refrigerating unit 32 and, again, the pump 33.

This ensures regular $CO_2$ circulation which can best be controlled by adjusting the pump in such a manner as to improve the efficiency of the inflow of cleaning fluid into the chamber 1 and therefore of the action produced thereby on the garments to be cleaned.

Under these circumstances, it just has to be pointed out that the chamber 1 is provided with nozzles for supplying liquid $CO_2$, which nozzles may be of various types depending on the methods by which cleaning is carried out; in this connection, reference should be made to the above-mentioned US patent purely for an indication of some of the possible technical solutions available.

It is also evident that these solutions can vary depending on the type of use intended for the apparatus; thus, for example, it will be appreciated that if garments are being cleaned, the nozzles will differ from those used for degreasing mechanical parts or for treating electronic components.

Once the cleaning cycle just described has been completed, the circulation of liquid $CO_2$ referred to above is interrupted; the chamber 1 is then emptied, leaving the pump 33 in operation so that it returns the liquid $CO_2$ to the tank 30 which in the meantime has been inserted in the path of the fluid again.

Advantageously, in order to compensate for the reduction in pressure inside the chamber 1, gaseous $CO_2$ coming from the upper portion of the tank 30 is caused to flow into the chamber 1; such compensation could alternatively be provided for by using the gaseous phase present in the distiller 31.

Finally, in accordance with a preferred embodiment of the invention, the load present in the cleaning chamber 1 is dried before the chamber is opened because, when the garments have been cleaned, they remain impregnated with liquid $CO_2$ which, if there were a sudden reduction in the pressure inside the chamber, could evaporate, thus bringing about sudden cooling of the load with freezing and weakening thereof and thus the risk of damage by breaking.

The drying operation is carried out by circulating gaseous $CO_2$ taken from the top of the cleaning chamber 1 by means of the compressor 36 and heated in the heater 39; the heated $CO_2$ is then reintroduced into the chamber 1 through nozzles arranged on the base thereof.

When the temperature in the chamber 1 ensures that there is no more liquid-phase $CO_2$ there, and this occurs when the temperature starts to increase because it can be inferred therefrom that the change of phase of all the liquid $CO_2$ is completed, it is possible to recover the gaseous $CO_2$.

In the apparatus according to the invention, this operation is carried out by the compressor 36 which, in a preferred embodiment, is operated with liquid $CO_2$ coming from the tank 30; the compressor will be described in more detail later on.

The compressor 36 sends the gaseous $CO_2$ to the tank 30 until a sufficiently low pressure is reached in the chamber 1 which will be determined in accordance with the best method of carrying out the operating cycle, that is to say, on the basis of a comparison between the economic advantage of recovering the $CO_2$, on the one hand, and the duration, as well as the cost, of the cleaning cycle, on the other.

The residual $CO_2$ present in the chamber is then evacuated through a normal outlet valve connected to the chamber, after which it is possible to open the chamber.

It will be appreciated from the above description that the cleaning apparatus according to the invention fully achieves the initially determined object.

The stages making up the cleaning process ensure correct operation of the apparatus by means of which the process is carried out and take into account the actual problems encountered in the handling of liquid or supercritical $CO_2$.

For example, the application of the initial vacuum in the cleaning chamber 1 prevents the ambient air present inside it from circulating in the installation for the $CO_2$: if it is borne in mind that these chambers may have capacities of some hundreds of litres, it will be appreciated that the presence of such a volume of air could be disadvantageous.

Naturally, a small amount of air will nevertheless be present at the start of each cycle in the $CO_2$ circuit but, because it is in a limited amount owing to the initial vacuum, it can be easily disposed by using simple discharge valves suitably arranged in the apparatus.

As regards the pressurisation of the cleaning chamber, its operation with gaseous $CO_2$ available in the distiller 31 and/or in the tank 30 constitutes an entirely advantageous solution both from the design point of view and from the economic point of view.

It will be first appreciated that best use is thereby made of two components of the apparatus, that have to be used for its operation anyway: consequently, it is not necessary to have special means for carrying out the pressurisation of the chamber or other systems for preventing the risks associated with the sudden inlet of liquid-state $CO_2$ into the cleaning chamber when it is under low pressure. Further to simplifying the apparatus, all the above also contributes to a reduction in costs.

Finally, it should be mentioned that the recovery of gaseous $CO_2$ by means of the compressor operated with liquid $CO_2$ is also a substantial innovation which makes this operation advantageous and efficient; the recovery of gaseous $CO_2$ is an operation which would not make sense in terms of economy of the cleaning cycle if carried out with extensive use of equipment and energy because $CO_2$ gas is readily available naturally and can also be discharged freely into the atmosphere.

By using the liquid $CO_2$ from the tank to operate the compressor, not only there is a reduction in energy consumption but also the $CO_2$ recovered is prevented from being contaminated with the lubricant which is normally used in traditional compressors.

There are of course variants of the apparatus according to the invention with respect to the example which has been provided above.

Indeed, it will be appreciated that the diagram of FIG. 1 represents only a simplified version of the apparatus in order to facilitate understanding thereof; actually, however, a large number of other components will be provided also in accordance with the various possible uses of the apparatuses.

In this connection, it should be pointed that the cleaning cycle according to the invention can also take place with the addition of additives to the dense-phase fluid; the additives may be of various types depending on the several applications of the invention and therefore the methods or the times by/at which they are introduced into the cleaning cycle, will vary from case to case.

For example, in order to solubilise contaminants present in the load to be cleaned (regardless of whether the load is composed of garments, parts to be degreased or other items) water or ethanol may be added to the $CO_2$, while, in order to cause physical or microbiological particles to be detached from the load, surfactants may be used; in the same way, in order to eliminate germs by chemical inactivation of the micro-organisms concerned, additives such as glutaraldehyde or quaternary ammonium salts may be used.

Finally, in order to increase the efficiency of the additives just described or also as an alternative thereto, the cleaning cycle described above could also be integrated with operations for inactivating undesired micro-organisms by a physico-chemical method. using plasma or radicals of sterilising agents such as hydrogen peroxide ($H_2O_2$), ultraviolet rays, or the like.

Therefore, in such circumstances, the cleaning cycle using $CO_2$ could be followed by a sterilising treatment carried out in the same apparatus: it will be appreciated that it would then be necessary to provide the necessary means ($H_2O_2$ supply, radiant lamps, etc.) in order to carry out the operations of normal cleaning with liquid $CO_2$ and sterilising treatment, which means are not present in the simplified version of the apparatus described above.

It should not be forgotten that the apparatus according to the invention may also comprise systems for detaching particles from the load to be cleaned, such as, for example, emitters of ultrasound or other types of vibration and pulsation in general.

Referring now to what has been initially stated, a description will now be given, with reference to FIGS. 2 to 7, of a specific cleaning chamber according to this invention which can be used preferably, but not exclusively, with the apparatus already considered.

This chamber 1 comprises a cylindrical jacket 2 with a longitudinal axis L arranged horizontally, which is provided at the rear with a convex bottom 3 and at the front with a lid 4 also convex.

In order to close the chamber 1, the cylindrical jacket 2 is provided along half of its circular mouth with an edge 5 having a substantially C-shaped cross-section (see FIG. 4); inside the edge there is a step 6 engaged by a rib 7a, which extends circumferentially along the outer edge of the half of the lid 4 to be coupled with the above-mentioned edge 5. As will be seen more clearly hereinafter, the coupling between the step 6 and the rib 7a constitutes an important safety element for the operation of the chamber 1.

The edges 8 and 9 of the remaining halves of the mouth of the cylindrical jacket 2 and of the lid 4, have respective cross-sections of a shape substantially reversed relative to that of the other halves.

Consequently, the lid 4 has a C-shaped edge 9 similar to that already seen above, into which the edge 8 of the mouth of the jacket 2 extends by projecting radially towards the outside. It should be pointed out that, for the sake of simplicity in the Example illustrated here, the edges 8 and 9 have no steps and ribs of the type referred to above: however, steps and ribs could be provided by forming them in a position inverted relative to the others, that is to say, on the lower face of the edge 8 and on the face, juxtaposed therewith, of the edge 9.

Figure 3:
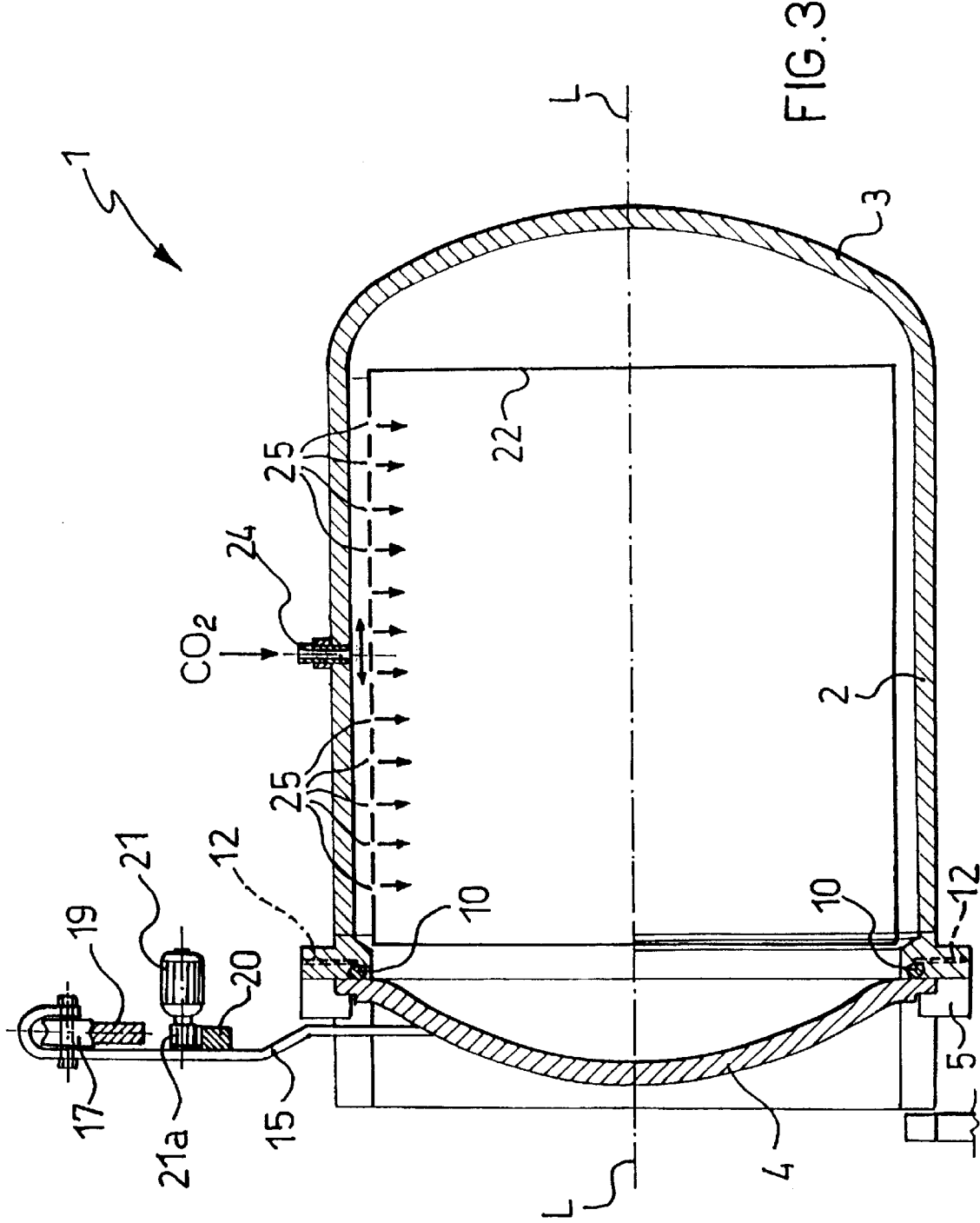
FIG. 3 is a longitudinal sectional view of the cleaning chamber of FIG. 9.

Sealing between the cylindrical jacket 2 and the lid 4 is ensured in the chamber 1 by a seal 10 arranged along the mouth of the cylindrical jacket in a suitable recess 11 extending circumferentially along the edge of the cylindrical jacket, and is activated by a fluid fed through ducts 12 shown with a broken line in FIG. 3 only. The fluid may be independent and may therefore be fed through its own, separate, circuit or may be a fraction of the cleaning $CO_2$, which is caused to circulate in the recess 11 in order to activate the seal 10.

More specifically, the seal and the recess are of the type having a cross-section tapering towards the lid, which is already known and used for sterilisation autoclaves; however, unlike known seals, the seal 10 is made from a suitable material that is resistant to carbon dioxide in the liquid state and, above all, in the supercritical state.

Surprisingly positive results as regards sealing have been obtained using seals based on epichlorohydrin rubbers; these rubbers consist of saturated aliphatic polyether and chloromethyl side groups.

Homopolymeric rubbers have the following structural formula:

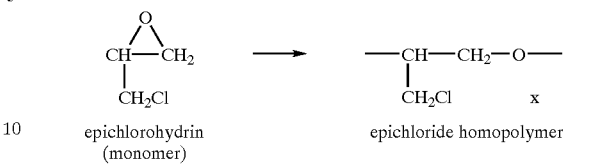

epichlorohydrin
(monomer)

epichloride homopolymer while copolymeric rubbers (a copolymer of epinchlorohydrin and ehtylene oxide) have the structural formulae:

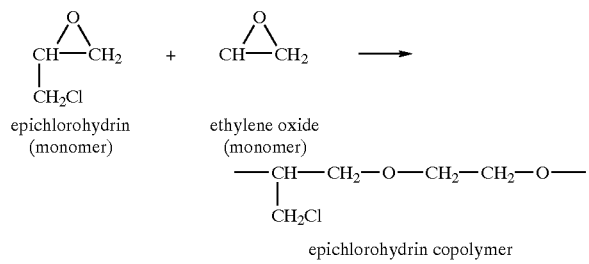

epichlorohydrin
(monomer)

ethylene oxide
(monomer)

epichlorohydrin copolymer

The seals produced using such materials have demonstrated the required compatibility with $CO_2$ and have above all exhibited a high degree of impermeability to supercritical carbon dioxide.

Supercritical carbon dioxide is a very special fluid having a density comparable to that of a liquid and having a viscosity close to that of a gas, but it also has a high degree of diffusivity so that it is rather difficult to prevent it from penetrating into sealing members or into gaps.

In this embodiment of the invention, a rack mechanism has been provided for opening and closing the chamber 1; to that end, the lid 4 is hung by means of two brackets 15 and 16, each of which is provided at its upper end with a respective wheel 17 and 18 engaged with a rail 19.

Below the rail there is a rack 20 secured to the two brackets 15 and 16, which is engaged by a pinion 21 a of a drive motor 21 mounted on an external frame of the chamber 1, not shown in the drawings.

The chamber 1 illustrated in the drawings is completed by a drum 22 which is arranged inside the cylindrical jacket 2, and a distributor tube 23 for the carbon dioxide fed from a connector 24 passing through the wall of the cylindrical jacket 2; the distributor tube extends along a generatrix of the cylindrical jacket and has a series of nozzles 25 from which the carbon dioxide is delivered into the drum.

As regards the actual cleaning cycle of the items of clothing that is carried out in the chamber 1, it takes place in known manner and therefore only a brief account thereof will be given here whereas for further details, reference should be made to the relevant publications and patents mentioned above.

Carbon dioxide in the liquid or supercritical state is then introduced into the cylindrical jacket 2 through the connector 24, while the tube 23 together with the nozzles 25 distributes it in the drum which, to that end, is produced with a perforated wall; with a suitable form of the nozzles 25, it is possible to direct the jets of carbon dioxide tangentially relative to the basket 22 in order to bring about the rotation of the load present inside it (in this case garments), making use of the energy of the incoming fluid. Such a solution is already known in the art but it is, however, clear that it could be replaced or integrated, for example, with a controlled rotation of the basket or another form of agitation of the load while keeping the basket stationary.

The liquid or supercritical carbon dioxide then leaves the chamber 1 (which is therefore provided with an outlet, not shown in the drawings) to be cleansed in the installation associated with the chamber, of the more or less soluble substances removed from the clothing.

At the start and at the finish of the cleaning cycle just described, the operations of opening and closing the chamber 1 are carried out by controlling the movements of the lid by means of the rack mechanism, in accordance with the following.

Owing to that mechanism the lid is guided accurately in its movements, so that the coupling of the two halves 5, 8 of the edge of the cylindrical jacket 2 with the corresponding halves of the lid 4 takes place without interference and with maximum simplicity; in this connection, it should be remembered that in order to provide the chamber 1 with a good seal, the precision of the coupling between the lid and the cylindrical jacket has to be high and, owing to the guided sliding of the first relative to the second in the invention, it is possible to satisfy such a condition.

It will also be noted that the guided sliding enables the cleaning chamber to be closed while avoiding slipping of the lid on the mouth of the cylindrical jacket, with all the obvious negative consequences that this fact would involve.

It should also be noted that, in this particular embodiment of the invention, the support of the lid by two (or also more) brackets 15 and 16, holds it rigidly in position during its translations along the rail 19, preventing it from oscillating in a pendulum movement.

Figure 4:
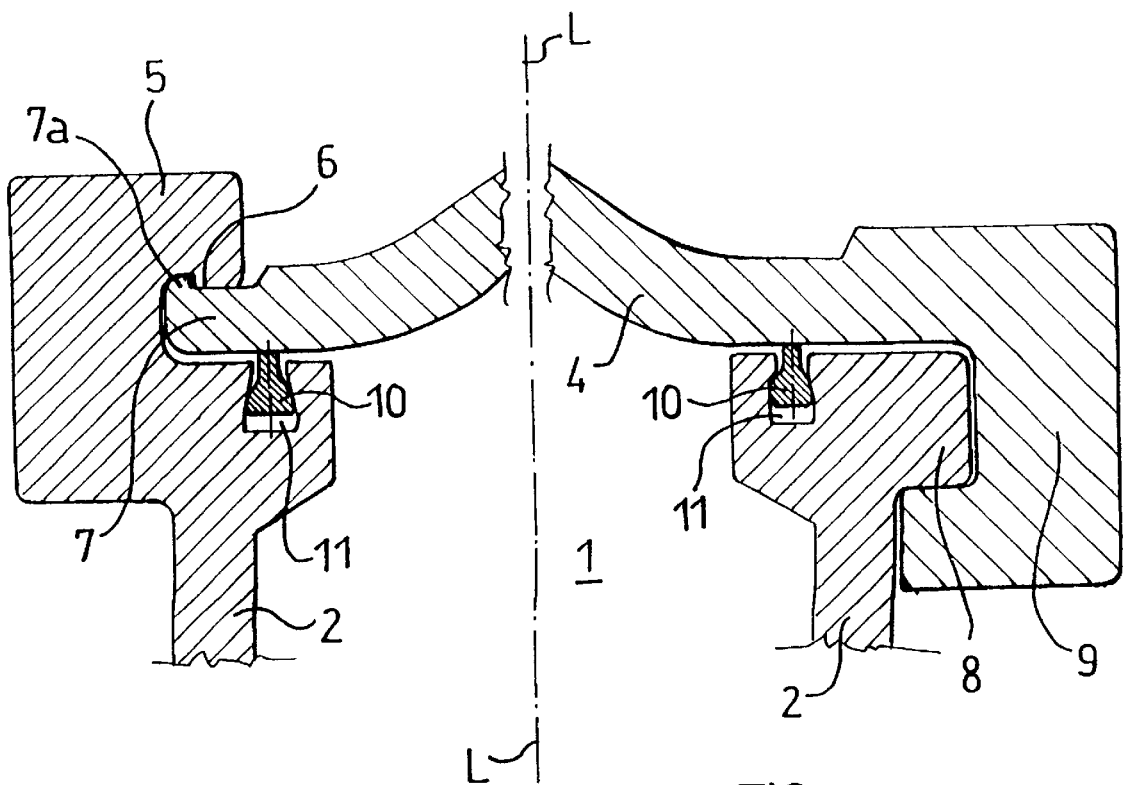
FIG. 4 is a sectional view of a detail of the cleaning chamber mentioned above, taken along a plane passing through the longitudinal axis "L" of the chamber and perpendicular to the plane of FIG. 3.
Figure 5:
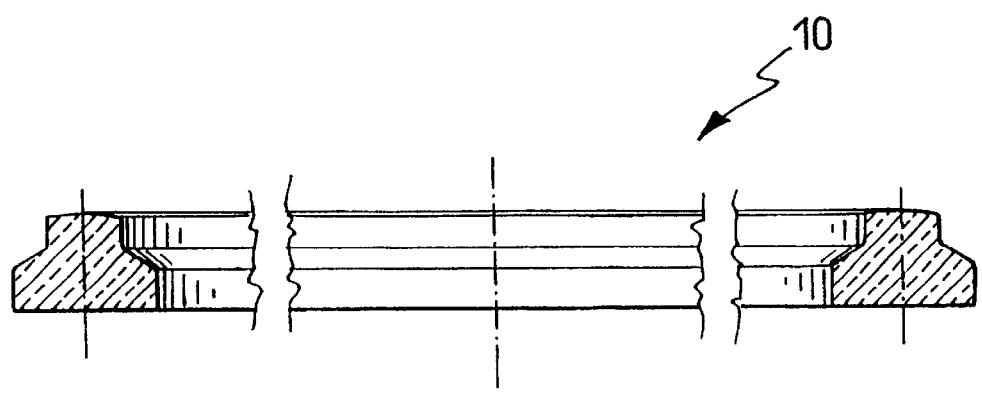
FIG. 5 shows in detail a seal of the previous cleaning chamber, in the non-operative state.

Once the chamber 1 has been closed, the seal 10 is activated as shown in FIG. 4; that is to say, the seal is pushed towards the opposite surface of the lid by the fluid which is injected into the recess 11, while, at the same time, the pressure in the chamber 1 increases owing to the supply of carbon dioxide thereto.

At this stage, the lid 4 is moved upwards (with reference to FIG. 4) by the pressure of the $CO_2$ acting on it, which promotes the engagement of its rib 7a in the step 6 of the edge 5 of the cylindrical jacket 2.

It should be pointed out here that under such conditions the seal 10 produced using the above-mentioned materials has demonstrated the important capacity to become deformed in such a manner as to provide optimum sealing of the space between the lid 4 and the mouth of the cylindrical jacket 2, while at the same time resisting the thrust directed onto it radially by the operating pressure of the carbon dioxide.

In order to open the chamber 1, the above procedure is reversed.

Therefore, to begin with, the pressure inside it is gradually reduced until it is returned to atmospheric level, while the seal 10 is also deactivated; at that point, it is possible to disengage the rib 7a from the step 6 and the lid can thus be removed, bringing about the translation thereof using the rack mechanism.

In this connection it will be appreciated that, if the pressure inside the chamber 1 does not decrease to an extent sufficient to permit the disengagement of the rib 7a from the step 6, these two elements will prevent the lid from sliding and therefore the opening of the chamber will be automatically prevented: this is therefore a special intrinsic safety feature of the invention, that is to say, it is not necessary to have an external control system having suitable sensors for detecting the pressure inside the chamber in order to cause it to function.

It will therefore be appreciated that such a safety feature can also be used in the event of any breakdown or malfunction of the above-mentioned general control system, preventing the inadvertent or premature opening of the chamber and thus contributing to its greater safety.

From the foregoing, the important results obtained by the cleaning chamber according to the invention will be appreciated.

Owing to the special configuration of the edges 5, 7, 8, 9 of the cylindrical jacket 2 and of the lid 4, according to which the edges extend circumferentially and over half of that extension, one has a substantially C-shaped cross-section that defines a seat wherein the other is accommodated and vice versa, the lid 4 can be held firmly and securely on the cylindrical jacket despite the substantial operating pressures of the cleaning chamber.

The lid is then fitted in an accurate, simple and rapid manner owing to the fact that it is guided slidably in a plane transverse to the cleaning chamber; the sliding of the lid also lends itself very favourably to the use of control means for opening and closing the cleaning chamber, of which the rack mechanism discussed here is clearly only one possible example.

It should be pointed out here that the use of structural elements having a C-shaped profile and coupled to mating edges for the firm positioning of the lid, is already known in the field of sterilisation autoclaves as demonstrated by the Italian patent No. 1237645, in the name of the same applicant for the present application.

However, in the field of sterilisation the pressures involved are substantially lower than those required for the $CO_2$ apparatuses concerned here (3–5 bar instead of 30–80 bar), and therefore it is possible to produce autoclaves having a parallelepipedal body instead of a cylindrical body as required for cleaning chambers; some examples of such autoclaves are given in the above-mentioned Italian patent.

Owing to the parallelepipedal shape of those autoclaves, their C-shaped elements for closing the lid are rectilinear: thus, some of them, in addition to being used as locking elements for the lid in order to prevent it from becoming detached from the body of the autoclave, are also used as guides when the lid is caused to slide transversely relative to the autoclave during its closing and opening operations.

In other words it may be said that in the prior patent, some of the C-shaped elements together with a portion of the edge of the lid of the autoclave substantially form a linear sliding pair able to guide the transverse sliding movements of the lid and, at the same time, to ensure that the lid is closed.

However, in cleaning chambers for carbon dioxide apparatuses, such a solution is not possible because the geometry involved is cylindrical (since, as already stated, it is made necessary by structural requirements) and therefore it is clearly not possible to form a linear sliding pair of the above-mentioned type between the edge of the jacket and the edge of the lid.

Consequently, in an entirely novel manner, the above-mentioned edges 5, 7, 8 and 9 are used in the chamber 1 of the invention purely to ensure the firm positioning of the lid 4 relative to the jacket 2 in order to prevent the lid 4 from becoming detached owing to the pressure of the $CO_2$, while the function of supporting and guiding the lid during the closing and opening stages is performed by suitable means (that in the previous example are provided by the rack mechanism but which could also be different, as will be seen hereinafter) not used, however, to attach the lid to the cylindrical jacket.

Moreover, in the embodiment of the chamber 1 referred to above, these means allow wide movements of the lid transversely to the cylindrical jacket in order to leave the mouth thereof practically free because, owing to the above-mentioned cylindrical geometry, it is not possible to attempt to combine small lateral movements with a subsequent "hinged" tilting of the lid as occurs in the case of autoclaves since, otherwise, the edges 5, 7, 8 and 9 would interfere with one another, thereby preventing such tilting.

In addition to such important results achieved by the invention, the contribution made by the special seal 10 should also be emphasised.

As stated, the seal has a cross-section tapering towards the lid in accordance with teaching already known in the art: this permits the better return of the seal into the associated accommodating recess when the fluid previously injected therein is discharged.

The above-mentioned tapered shape does not create difficulties when fitting the soft seals into their accommodating recesses, used in the case of containers for fluids that do not have the characteristics of liquid or supercritical carbon dioxide.

Indeed, as already explained, such a fluid is a very effective solvent and has, above all, a great molecular diffusivity so that it is rather difficult to contain it: in fact, the materials normally used for seals (such as silicone and the like), although chemically compatible with $CO_2$, tend to be penetrated thereby.

Other materials such as PTFE or derivatives, although suitable per se for containing supercritical $CO_2$, have been found to be insufficiently resilient so that the mounting of the seals having a tapering cross-section in the accommodating recesses was not practicable. FIG. 4 shows that the accommodating recess also has a tapering shape and, because the corresponding seal has to be introduced into it from above, it will be appreciated that its larger base cannot pass through the open upper portion of the recess.

The epichlorohydrin rubbers mentioned above, in addition to being capable of containing supercritical $CO_2$, also have a certain resilience which makes it possible to deform them in such a manner as to enable the seals formed therefrom to be mounted in the corresponding accommodating recesses, even if their cross-sections are tapered.

Naturally, it is also possible to have variants of the invention with respect to the embodiment thereof which has been discussed hitherto.

The mentioned embodiment indeed is intended mainly for large cleaning chambers, such as those used in laundries or other services which require the cleaning of large amounts of clothing or other objects in general.

The horizontal arrangement of the longitudinal axis of the chamber facilitates the work of an employee in carrying out the operations of loading and unloading it; these operations are also helped by the fact that, in accordance with the invention, the lid 4 closes the entire mouth of the cleaning chamber which is thus completely freed when the lid is removed.

In other words, the lid is not simply a porthole or the like through which a limited and difficult access to the inside of the cleaning chamber may be obtained, but in practice it constitutes a true removable end face, opposite to the fixed bottom face 3, which is fitted on the mouth of the cylindrical jacket and whose opening permits optimum action inside it. This is all the more important if it is borne in mind that the cleaning chamber is a container that has to withstand high operating pressures.

Nor should it be forgotten that the horizontal arrangement of the axis L enables a person to work from the front at the mouth of the chamber and therefore more comfortably compared with the case of a large chamber having an upright axis.

In addition, in cleaning chambers of a certain size the lid is heavy and therefore the possibility of hanging it on a horizontal guide structure as in the example mentioned, simplifies its handling which can optionally also be effected manually and not purely mechanically.

However, the situation would be different in the case of a hinged type lid because, if the cleaning chamber is large, its weight and the inevitable space required for the opening and closing operations could give rise to relevant difficulties for an operator, as well as the use of a control mechanism would appear to be rather complex.

A further substantial advantage of the invention resides in the fact that the means provided therein for supporting and guiding the lid, that is to say, the rail and the rack mechanism of the previous example, are separate from the cylindrical jacket: this prevents overloading of the structure of the jacket which would otherwise have to have dimensions (above all a thickness) suitable for bearing the weight of the lid which, in the case of chambers of a certain size, is certainly not inconsiderable. Since the cylindrical jacket, the associated bottom and the closing lid are produced from special materials (preferably stainless steels) which are thus also expensive, such a cleaning chamber enables the use of those materials and thus the costs deriving therefrom, to be reduced.

Figure 6:
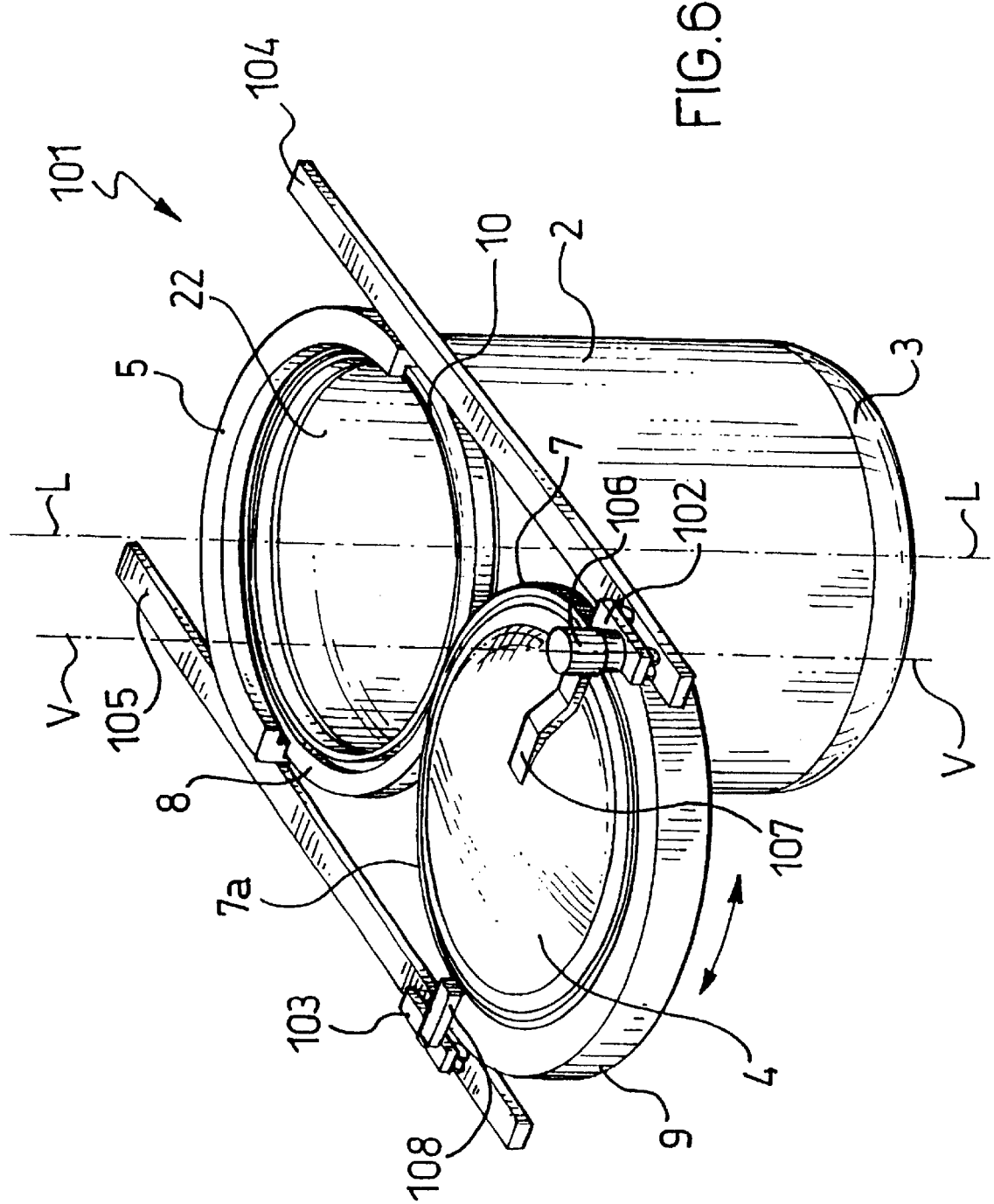
FIG. 6 is an axonometric view of a variant of the cleaning chamber shown in the previous Figures.
Figure 7:
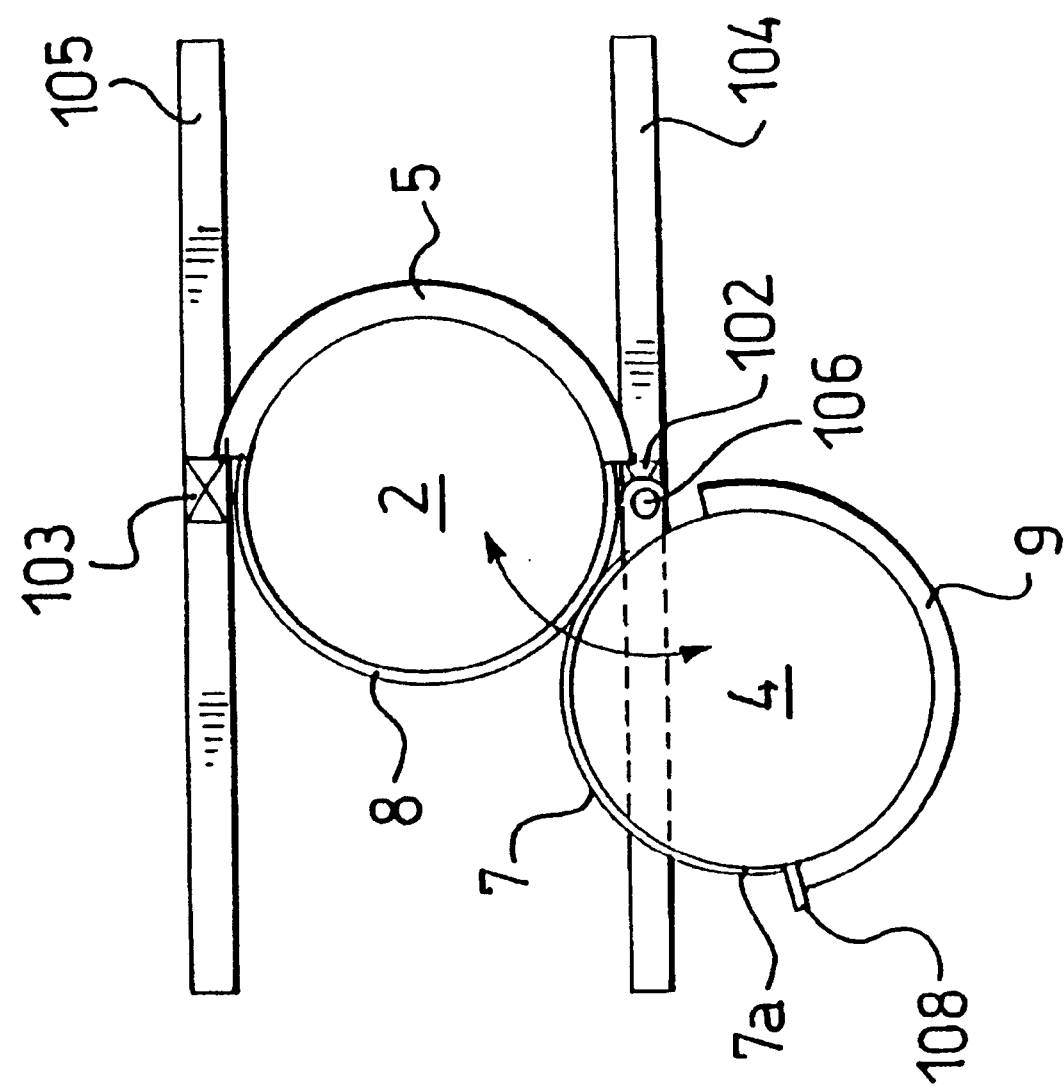
FIG. 7 is a top view of the cleaning chamber of FIG. 6.

An alternative embodiment of the invention suitable for small cleaning chambers is shown in FIGS. 6 and 7 where the chamber is generally indicated 101.

This embodiment will be described briefly hereinafter with particular reference to its main differences from the previous one; however, for the sake of simplicity, elements that are structurally or functionally equivalent to those already considered will be designated by the same numbers and will not be analysed further in detail, attention being drawn to the explanations provided above for that purpose.

As will be appreciated, the cleaning chamber 101 is in this case of the type having an upright longitudinal axis L and is closed by a lid 4 guided slidably in a direction transverse to that axis.

However, in this variant the lid 4 rests on two sliding blocks 102, 103 movable along respective parallel guides 104, 105 arranged on opposite sides relative to the lid. More especially, the lid 4 is connected to the sliding block 102 by means of a hinge 106 and a radial arm 107 in order to be able to pivot about an upright axis V; diametrically opposite that arm is a peg 108 which projects radially from the lid and which is supported by the sliding block 103.

The edges 5, 7, 8, 9 of the cylindrical jacket 2 and of the lid 4 are coupled to one another owing to the shape of their cross-sections along respective semicircles in a manner entirely similar to that already explained; in this second embodiment of the invention, however, the lid 4, in addition to being translated solid with the sliding blocks 102 and 103 in a plane transverse to the longitudinal axis L, is also able to pivot in that plane owing to the fact that it is hinged to the sliding block 102, as shown in FIG. 7.

Consequently, the operations of opening and closing the chamber can take place either by translating the lid 4 (as shown in FIG. 6), or by causing it to pivot about the axis V (as in FIG. 7), or by combining both these movements.

It will therefore be appreciated from the above that this further embodiment of the invention also achieves the important results of the previous one and consequently, for the sake of brevity, on this subject reference should be made to the explanations provided in connection with the first embodiment, naturally giving due consideration to the differences concerned.

It just has to be pointed out here that this variant does not provide for means of controlling the movements of the lid, given that, for small dimensions of the cleaning chambers, the operations of closing and opening can be readily carried out manually; it is, however, clear that the presence of such means should not be excluded.

It should also be noted that the possibility of pivoting the lid is particularly suitable for cleaning chambers having an upright axis because these chambers do not involve the risk of pendulum movements of the lid caused by the force of gravity, as occurs in chambers having a horizontal axis.

Figure 8:
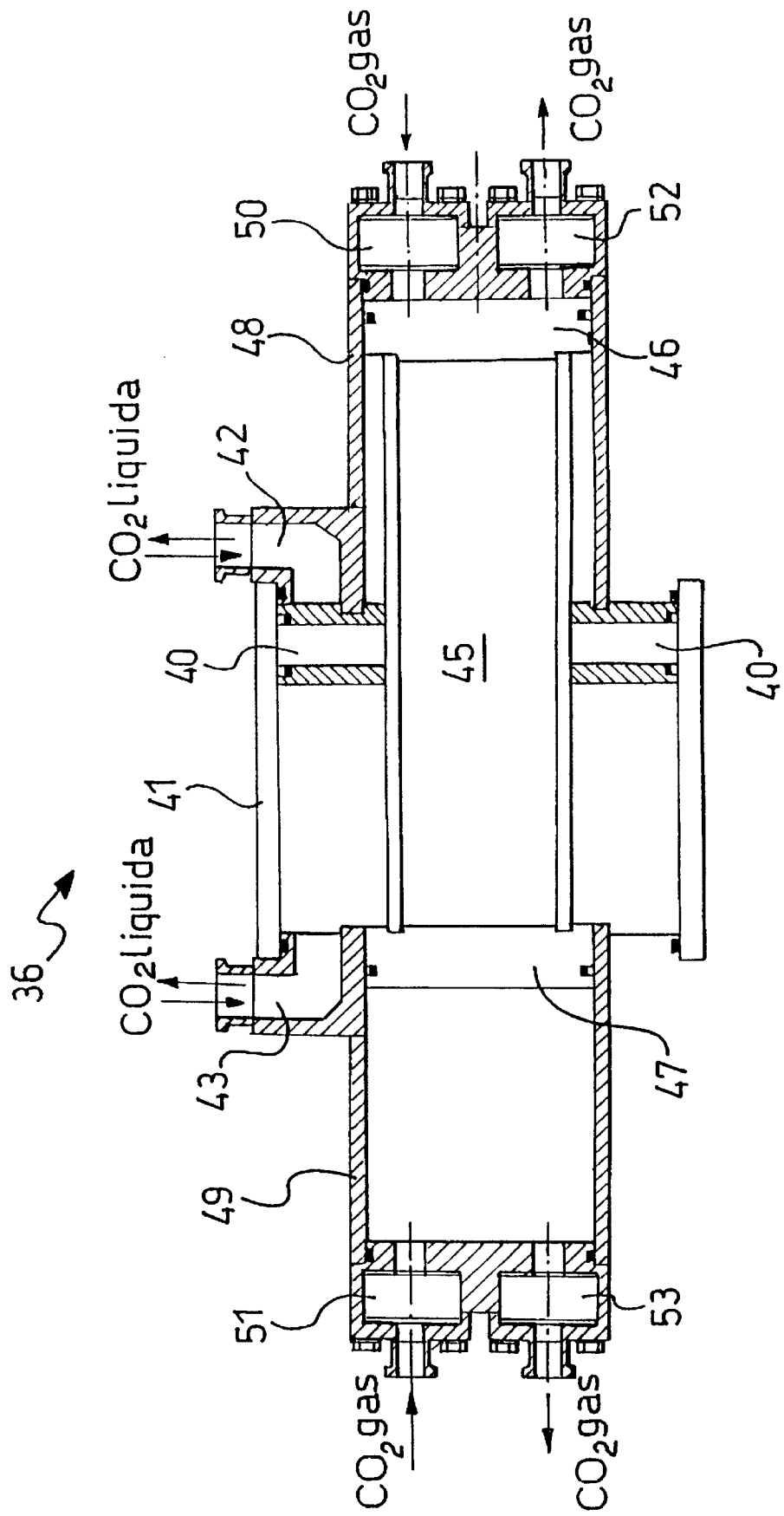
FIG. 8 is a longitudinal sectional view of a compressor present in the cleaning apparatus according to the invention.
Figure 9:
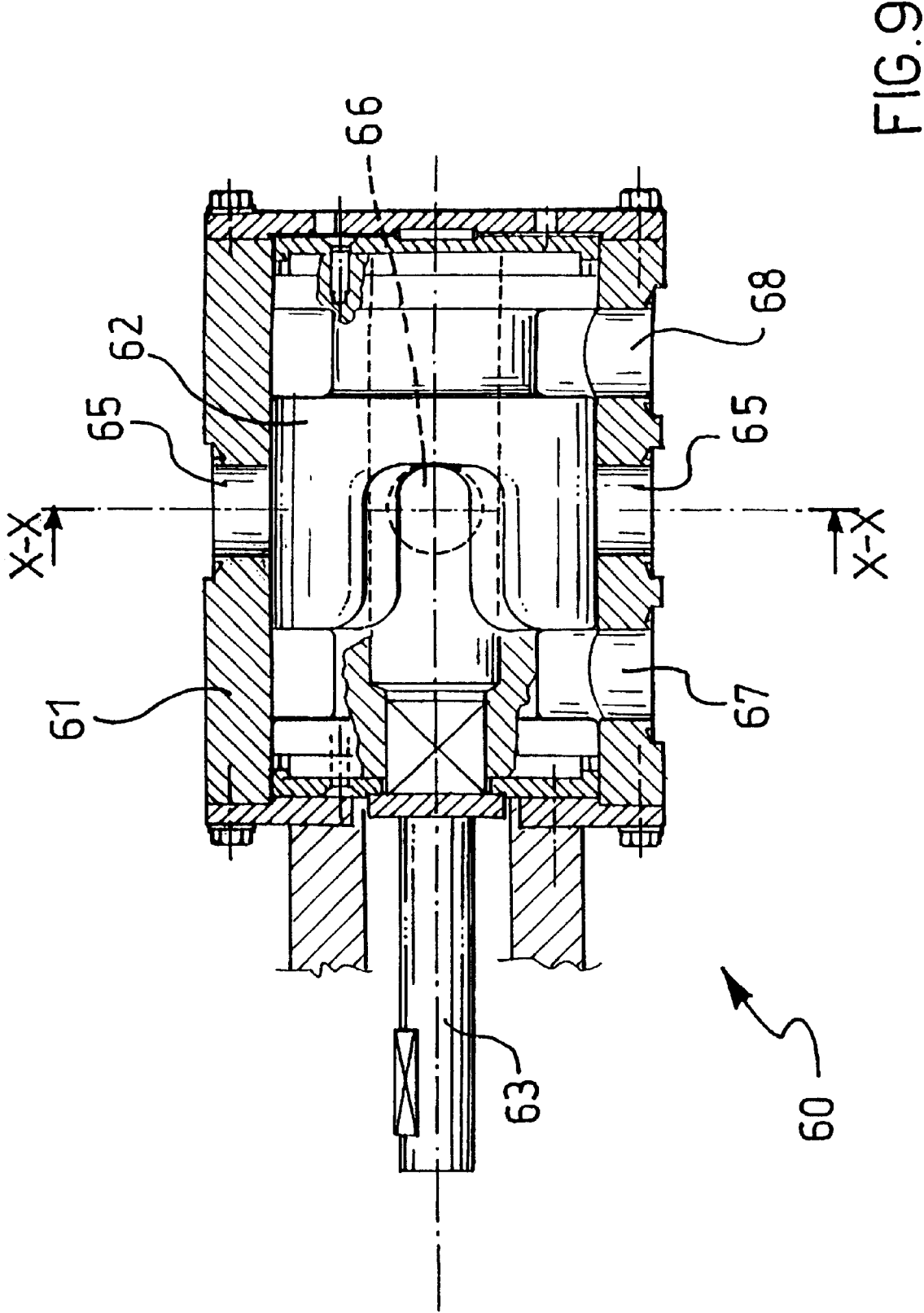
FIG. 9 is a longitudinal sectional view of a distributor of liquid $CO_2$ associated with the compressor of FIG. 8.
Figure 10:
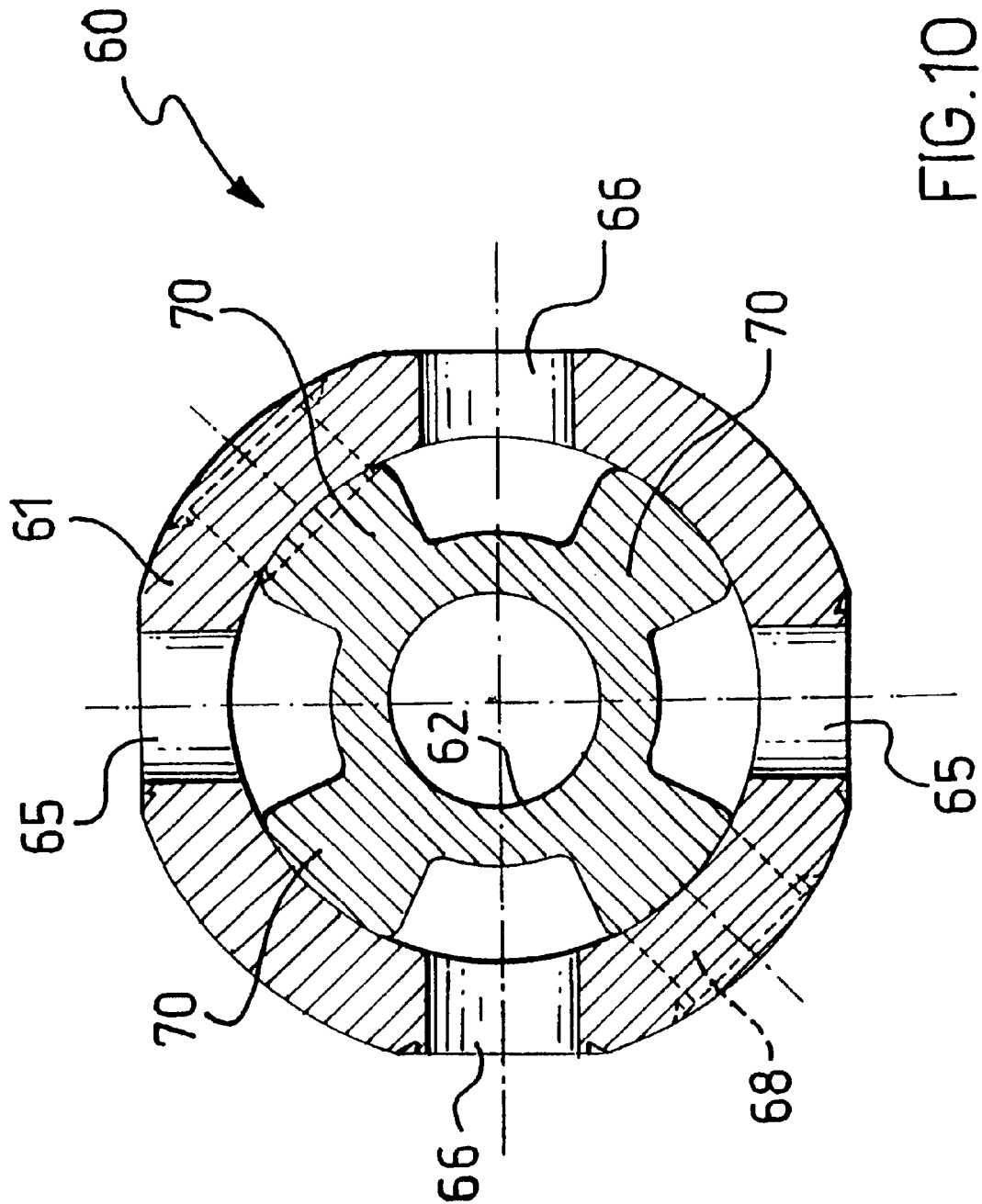
FIG. 10 is a sectional view taken along line X—X of FIG. 9.

Finally, referring to FIGS. 8–10, brief mention will now be made of the compressor 36 operated by liquid $CO_2$, which was discussed above.

The compressor has a double-action piston 40 which is configured as an annulus and is movable in a central casing 41 supplied with liquid $CO_2$ that, in the case of the apparatus of FIG. 1, comes from the tank 30.

In particular, the liquid $CO_2$ enters and/or leaves by two openings 42, 43 communicating with a distributor 60 shown in FIG. 9, as will be explained later.

The double-action piston 40 is mounted on a tubular sleeve 45 which is closed at its ends by two discs 46, 47 sealingly coupled to the walls of two cylindrical chambers 48, 49, arranged at the sides of the central casing 41; the cylindrical chambers 48, 49 are closed by an end face on the side remote from the above-mentioned discs and are each provided with an inlet valve, 50 and 51 respectively, and with an outlet valve, 52 and 53.

The valves are used for the intake and delivery of gaseous $CO_2$ which, in the case of the apparatus of FIG. 1, comes from the cleaning chamber 1 and is either delivered to the tank 30 or is returned to the chamber 1, as occurs in the case of the valves of normal internal combustion engines.

The functioning of the compressor just described is quite simple.

The high-pressure liquid $CO_2$ coming from the tank 30 is admitted into the central casing 41 through one of the two openings 42 and 43; in that situation, the other opening is not charged with the pressure of the tank and the piston 40 can move from right to left or vice versa, depending on the difference in pressure of the liquid $CO_2$ acting on its opposite faces.

The alternating movement of the piston 40 is transmitted to the sleeve on which it is mounted and, therefore, the discs 46 and 47 arranged at the ends of the sleeve move inside the cylindrical chambers 48, 49 in the manner of plungers, sucking in and compressing gaseous $CO_2$ which flows through the valves 50, 52 and 51, 53.

The switching of the supply of liquid $CO_2$ at the openings 42, 43 and therefore the control of the stroke of the piston 40 can be effected in various manners, for example by providing sensors in the compressor and by controlling the supply electronically by means of servovalves.

However, in accordance with a preferred embodiment of the invention, the switching is carried out using the electromechanical distributor which will now be explained briefly.

The distributor 60 is in practice formed by a cylindrical housing 61 closed at the ends and in which is mounted a rotor 62, splined onto a drive shaft 63 protruding from one end of the housing 61; a drive motor (not shown in the drawings) is arranged on the shaft.

In the area of a median transverse plane of the cylindrical housing there are formed two pairs of apertures 65 and 66 which are arranged diametrically opposite one another and which connected, respectively, to the tank 30 of high-pressure liquid $CO_2$ and to an outlet at lower pressure.

Similar apertures 67, 68 are arranged along two other transverse planes which are located at the sides of the above-mentioned median plane and are in communication, respectively, with the inlet openings 42, 43 of the compressor 36.

The rotor 62 has four lobes 70 which, as a function of its rotation, bring the pairs of apertures 65 and 66 into communication, respectively, with the two apertures 67, 68 and thus with the openings 42, 43.

Consequently, depending on the angular position of the rotor, liquid $CO_2$ enters or leaves through the openings 42, 43 of the compressor at different pressures (that is to say, the pressure of the tank 30 and the pressure of the outlet connected to the apertures 66) so that the opposite faces of the piston are acted upon by a differential pressure such as to cause it to move back and forth in the central casing 41.

What is claimed is:

1. An apparatus for cleaning using a dense phase fluid circulating therethrough, the apparatus comprising:

a cleaning chamber comprising a cylindrical jacket having at one end a fixed bottom and being closed by a removable lid at the opposite end, wherein the lid is surrounded peripherally by a circular edge having first and second sections to be applied on corresponding first and second sections of an edge of the open end of the cylindrical jacket; the open end of the cylindrical jacket and the lid defined by the first sections of their respective edges each having a longitudinal extension substantially equal to half their circumference and a substantially C-shaped cross-section, which sections are suitable for receiving, respectively, the second sections of the corresponding edges of the lid and of the open end having a mating shape; the lid being supported by means outside the cylindrical jacket in such a manner as to be movable transversely thereto between a first position in which it is at a distance from the jacket, leaving the open end thereof substantially free, and a second position in which the lid closes that end by engaging with the edge thereof;

a tank for the fluid;

a distiller;

a refrigerating unit;

pumping means; and means for filtering the fluid, wherein during at least part of a cleaning cycle, the dense phase fluid supplied by the pumping means along a path from which the tank and the distiller are excluded, circulates through the cleaning chamber.

2. An apparatus according to claim 1, wherein the lid of the cleaning chamber is slidably supported by guide means so that it is movable between the first and second positions as a result of its sliding guided by those means.

3. An apparatus according to claim 1, wherein the lid of the cleaning chamber is supported by hinging relative to an axis (V) parallel to that (L) of the cylindrical jacket, and is slidably supported by guide means so that it is movable between the first and second positions as a result of at least one of its pivoting about that axis and its sliding guided by those means.

4. An apparatus according to claim 3, wherein the hinge axis (V) of the lid and the axis of the cylindrical jacket are upright.

5. An apparatus according to claim 1, wherein the cleaning chamber comprises at least one seal between the lid and the cylindrical jacket, which seal is made from epichlorohydrin rubber.

6. An apparatus according to claim 5, wherein the at least one seal is accommodated in a recess formed along the first and second sections of the edge of the cylindrical jacket and both have a cross-section tapering towards the lid.

7. An apparatus according to claim 6, wherein the at least one seal is activated with the cleaning fluid present therein.

8. An cleaning apparatus according to claim 1, wherein along at least one of the portions of the second section of one of the lid and the cylindrical jacket which engage with the corresponding first sections having C-shaped cross-section, there is provided a rib suitable for engaging in a step of the other section in order to prevent the movement of the lid from the second to the first position, when the pressure in the cleaning chamber is greater than a predetermined value.

9. An apparatus according to claim 1, wherein the fixed bottom and the lid of the cleaning chamber are convex.

10. An apparatus according to claim 1, wherein the means for guiding the lid comprise a rack drive mechanism which can be adjusted in such a manner as to limit the closing force to levels safe for a user.

* * * * *